United States Patent [19]

Humpolik

[11] Patent Number: 4,958,428
[45] Date of Patent: Sep. 25, 1990

[54] PROCESS AND AN ARRANGEMENT FOR PRODUCING A SUPPORTING BODY FOR A CATALYTIC REACTOR

[75] Inventor: Bohumil Humpolik, Ludwigsburg, Fed. Rep. of Germany

[73] Assignee: Süddeutsche Kühlerfabrik Julius Fr. Behr GmbH & Co. KG, Fed. Rep. of Germany

[21] Appl. No.: 430,897

[22] Filed: Oct. 30, 1989

Related U.S. Application Data

[63] Continuation of Ser. No. 264,018, Oct. 28, 1988, abandoned.

[30] Foreign Application Priority Data

Nov. 13, 1987 [DE] Fed. Rep. of Germany ....... 3738537

[51] Int. Cl.⁵ .............................................. B21D 53/00
[52] U.S. Cl. ........................................ 29/890; 422/180
[58] Field of Search ....................... 29/890.05, 890.045, 29/890.053, 890.054, 890

[56] References Cited

U.S. PATENT DOCUMENTS

| | | | |
|---|---|---|---|
| 4,576,800 | 3/1986 | Retallick. | |
| 4,741,082 | 5/1988 | Kanniainen et al. | 29/157 R |
| 4,750,251 | 6/1988 | Motley et al. | 29/157 R |
| 4,782,570 | 11/1988 | Spridco | 29/157 R |

FOREIGN PATENT DOCUMENTS

| | | |
|---|---|---|
| 0151229 | 10/1984 | European Pat. Off. . |
| 0186801 | 12/1985 | European Pat. Off. . |
| 0216130 | 8/1986 | European Pat. Off. . |
| 2001547 | 2/1979 | Fed. Rep. of Germany . |
| 3311654 | 10/1984 | Fed. Rep. of Germany . |
| 3347086 | 7/1985 | Fed. Rep. of Germany . |
| 3510715 | 10/1986 | Fed. Rep. of Germany . |
| 3715040 | 11/1987 | Fed. Rep. of Germany . |

OTHER PUBLICATIONS

European Search Report.

*Primary Examiner*—Timothy V. Eley
*Attorney, Agent, or Firm*—Evenson, Wands, Edwards, Lenahan & McKeown

[57] ABSTRACT

A process and an arrangement for producing a supporting body for a catalytic reactor is disclosed. In order to reduce thermal stress between the casing tube and the wound metal supporting body of an exhaust gas catalyst, the temperatures of which vary significantly during operation, it has been proposed to provide the ring-type composite of metal strips fastened in a casing tube with slots extending in longitudinal direction. This type of production results in high expenditures. The new process and arrangement of the invention provides that incisions are made directly into the metal strips before the winding or folding of the supporting body, so that a subsequent processing becomes superfluous. The thus produced supporting bodies have a plurality of incisions extending within the ring-type composite which can also prevent the buildup of thermal tensions or stress. The new supporting bodies are used for exhaust gas catalysts of motor vehicles.

22 Claims, 2 Drawing Sheets

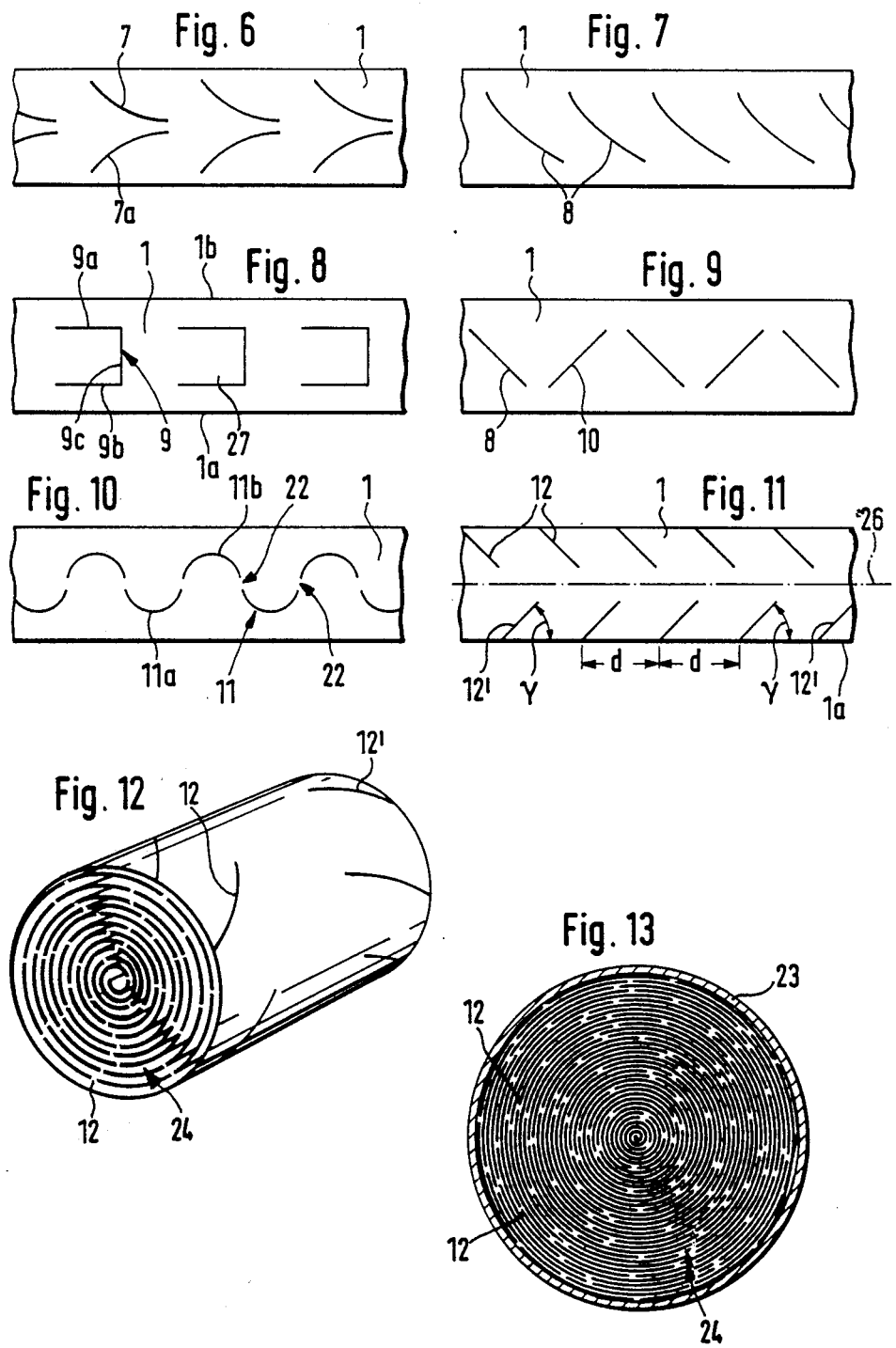

PROCESS AND AN ARRANGEMENT FOR PRODUCING A SUPPORTING BODY FOR A CATALYTIC REACTOR

This is a continuation of application Ser. No. 264,018, filed Oct. 28, 1988, now abandoned.

BACKGROUND AND SUMMARY OF THE INVENTION

The invention relates to a process and an arrangement for producing a supporting body for a catalytic reactor for purifying exhaust gas, particularly of internal-combustion engines in motor vehicles. More specifically, the invention relates to such process and arrangement in which corrugated or corrugated and smooth metal strips are wound or folded to form adjacent layers and are provided with slots extending transversely to their longitudinal direction.

A process of this type is known from German unexamined published Application (DE-OS) No. 33 11 654 in which a catalyst supporting body is wound up spirally from smooth and/or corrugated sheet metal strips, which body is then fastened in a casing tube. The thus created ring-type composite of the supporting body is then provided with slots in the area of the wound metal strips by means of known cutting and removing methods, such as laser bean cutting or spark erosion. These slots extend through the wound part of the supporting body in the longitudinal direction and are arranged approximately radially or in the direction of filaments. By means of this measure, the interior ring-type composite can be divided into several sectors or segments which are free of a tension or stress-generating thermal expansion. It is known that supporting bodies for catalytic reactors, during operation, can be heated by means of the catalytic conversion of the exhaust gas, from an operating temperature of approximately 500° C. locally over more or less large areas to temperatures of over 900° C. However, the thick-walled casing tube surrounding them retains its relatively low operating temperature of approximately 300° C. for a longer period of time. The thermal stress which may therefore be expected and which may result in a detaching of the wound body from the casing tube, can be avoided by the arrangement of such slots.

The disadvantage of this above-noted arrangement resides in the relatively high expenditures for arranging such slots.

An object of the invention is to develop a process and arrangement of the above-noted type such that the wound or folded composite of metal strips is provided with the possibility of a thermal expansion without the requirement of processing the supporting body again after its production.

In order to achieve this object, it is provided according to preferred embodiments of the invention that the slots are first worked directly into the metal strips in the form of incisions, and that the metal strips are only subsequently wound or folded to their final shape. As a result of this measure, every individual layer of the wound metal strip or strips receives a certain freedom of expansion. Although the finished supporting body, which is produced according to such a process, has no through-slots which extend approximately radially or in the shape of filaments, it has a plurality of slots, which as a rule are distributed on the cross-section relatively non-uniformly and which provide to each individual layer the possibility to expand and thus also prevent that the finished supporting body can be damaged in its construction by thermal stress. The producing of the new supporting body is relatively simple because it is sufficient, in the case of a corresponding production arrangement, such as has been used for winding, or for the folding of metal strips, to place a pair of cutting rollers directly in front of the actual winding or folding arrangement. By means of this pair of cutting rollers, the metal strip to be processed or the metal strips to be wound or folded are then incised in the desired manner.

The incisions themselves may be made in different ways according to various advantageous preferred embodiments of the invention as illustrated in the drawings. It is not only contemplated in certain preferred embodiments to place the incisions in each case from the direction of the longitudinal edges of the strips toward the inside, but it is also contemplated to incise the strips only in their center area. In all cases, possibilities to expand are provided for the strips which prevent damage to the supporting body caused by thermal expansion.

Other objects, advantages and novel features of the present invention will become apparent from the following detailed description of the invention when considered in conjunction with the accompanying drawings.

BRIEF DESCRIPTION OF THE DRAWINGS

FIGS. 2, 3, 4, 5, 6, 7, 8, 9, 10 and 11 are each schematic plan view sections of a strip which had been provided with incisions before their winding or folding into a supporting body, constructed according to respective different embodiments of the invention;

FIG. 12 is a perspective, but schematic representation of a metal strip of the embodiment of FIG. 11 wound to a cylinder shape supporting body; and FIG. 13 is a frontal view of the cylinder shape supporting body of FIG. 12 which is inserted into a casing tube.

DETAILED DESCRIPTION OF THE DRAWINGS

Figure 1:
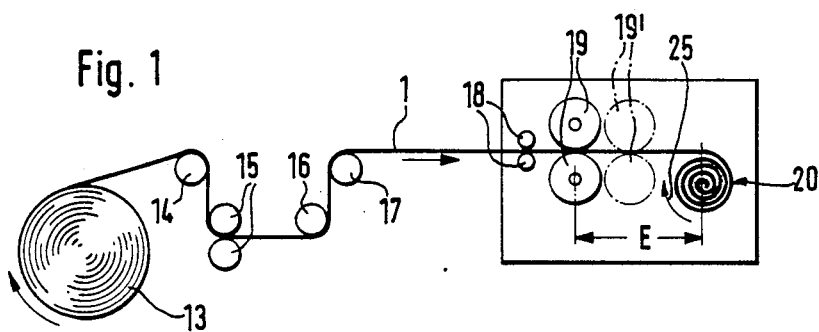
FIG. 1 is a schematic representation of an arrangement for producing a supporting body for a catalytic reactor according to the process of the invention.

FIG. 1 shows an arrangement by means of which the process of the invention may be carried out. An initially smooth metal strip is first wound off a coil 13 and, via a deflecting roller 14, is led to a pair of embossing rollers 15 which provides the initially smooth strip with a corrugation pattern which may, for example, be rectangular or trapezoid shaped. Deflecting or upsetting rollers 16, 17 which follow embossing rollers 15, receive the corrugation with an approximately trapezoid embossed cross-section which, when this metal strip 1 is wound, ensures that the adjacent layers cannot slide into one another. This corrugated strip is taken up by a pair of driving or braking rollers 18 in the actual winding device 20 and is then guided through a pair of cutting rollers 19 and subsequently, by being wound up in the direction of the Arrow 25, is wound to an approximate cylinder shape, as shown in FIG. 12. After the desired cylinder shape body has been obtained, the strip 1 is, in each case, cut off from the part of the strip that follows by means of cutting devices that are not shown, and the following strip is wound up again to form another cylinder body.

The thus obtained cylinder body is then slid into a casing tube and is firmly connected with it in a known manner, which may take place, for example, by soldering. An embodiment of this finished supporting body, which is surrounded by the casing tube 23, is shown in its cross-section in FIG. 13.

Figure 2:
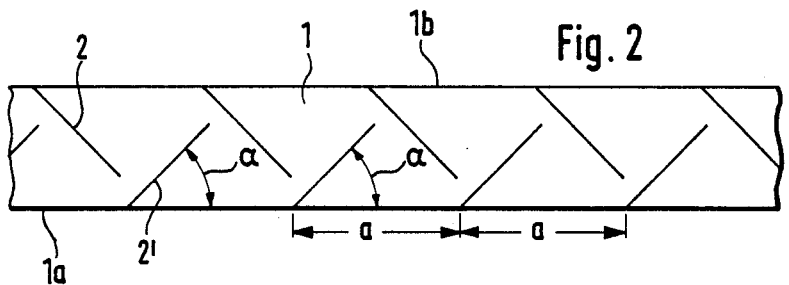

As shown in FIG. 2, the corrugated metal strip 1, the corrugations of which are not shown here, is provided with incisions 2, 2' via the pair of cutting rollers 19. These incisions 2,2', in each case, start from the two longitudinal edges 1a, 1b of the metal strip 1 and extend at an angle ($\alpha$) diagonally to the longitudinal axis of the metal strip 1 to a position beyond the center of the metal strip. The incisions 2, 2' which, in each case, start out from opposite longitudinal edges 1a or 1b, in this embodiment, are disposed perpendicularly to one another. The incision angles ($\alpha$) have the same size for incisions 2 and 2' respectively and, in the illustrated preferred embodiment of FIG. 2, extend at 45°. It is also contemplated to provide other angles. However, this illustrated arrangement of the incisions results in an advantageous extensive subdividing of the metal strip 1 on its surface making it possible for the cylinder body 24 (FIG. 12) to expand relatively freely after the winding and to be able to absorb expansions if, during the operation of the catalytic converter, temperature differences occur between the outer casing tube and the inner wound body. The incisions 2, 2' are in each case cut into the metal strip 1 from points having the same distance (a) from one another. However, it is also contemplated to arrange the incisions at unequal distances from one another. This may take place according to a certain regularity, for example, according to an arithmetical progression, so that certain patterns are created on the front face of the finished metal support.

Figure 3:
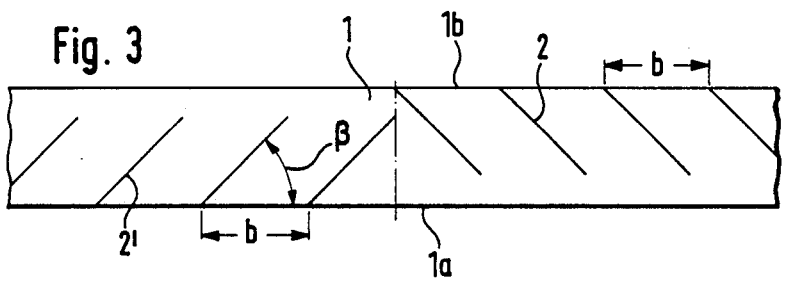

FIG. 3 shows another embodiment which, however, can lead to a similar advantageous result. Here the incisions 2 are also cut into the strip at an equal distance (b) with respect to one another in the direction of the longitudinal edge 1a, 1b, in parallel to one another. However, no incisions 2' starting from the other side are provided that are offset to these incisions such that the opposite incisions, in each case, take up positions with respect to one another so as to fill gaps. In contrast, the incisions 2' starting out from the other longitudinal edge 1a, in this case—viewed in longitudinal direction of the strip—are arranged in a different area which, however, with respect to its length, should be dimensioned such that it corresponds at least to the length (E) between the pair of cutting rollers 19 and the wind-up axis (FIG. 1)+$\pi$ times a median diameter of the finished cylinder body wound from the strip. It will then be ensured that the position of the incisions 2, 2' in adjacent layers of the wound body changes sufficiently often in order to permit the desired uniform compensation of thermal expansion within the wound body.

Figure 4:
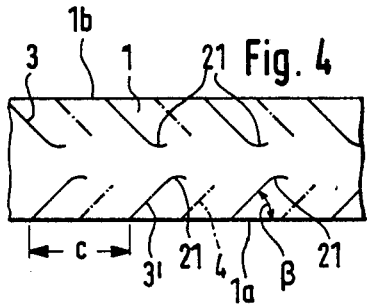
Figure 5:
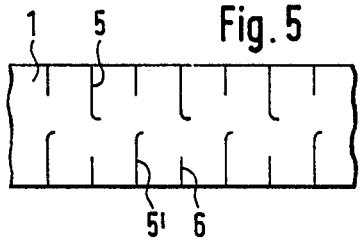

FIG. 4 and FIG. 5 show embodiments with incisions 3 and 5 in the metal strip 1 which, similarly to the incisions 2, 2', extend diagonally with respect to the longitudinal axis and at an equal distance (c) with respect to one another in each case starting from the longitudinal edges toward the inside. However, the incisions 3, 3' and 5, 5' are configured to be only so long that their closed ends 21 do not reach to the center of the metal strip 1. At this closed end, the incisions 3, 3', 5, 5', in each case, end in a curved shape 21. Their slope with respect to the longitudinal axis of the strip 1, in the embodiment of FIG. 4, is at an angle ($\beta$) of the embodiments corresponding to FIG. 3. Other angles are also contemplated in certain embodiments. It is also contemplated in alternative embodiments to, in each case, also provide shorter incisions 4 (show in dash-dotted lines in FIG. 4) between the longer incisions 3, 3'. These incisions 4 extend in parallel to the incisions 3 and 3' and are provided in the center of the space (c) between the two incisions 3 and 3'.

In the embodiment of FIG. 5, the incisions 5,5' are placed to extend periodically to the longitudinal direction of the metal strip 1. Here also, shorter incisions 6 may be provided in each case in the center between two longer incisions 5,5'. The embodiment of FIG. 11, which will be explained later, also has incisions 12, 12' which extend diagonally to the longitudinal direction of the strip but not to the center of the strip 1.

FIGS. 6 to 10, on the other hand, show embodiments of strips in which incisions 7, 8, 9, 10, 11 do not start out from the longitudinal edges of the respective strip 1, but are arranged in the center of the strip 1. Thus FIG. 6 shows an embodiment in which incisions 7, 7a are, in each case, incised at the same angle, but in opposite direction to one another in the center of the strip such that they extend in an approximate arrow shape with respect to one another. The incisions may also have a straight shape. FIG. 7 shows an embodiment in which incisions 8 are arranged diagonally with respect to the longitudinal direction in the center of the strip 1. A similar arrangement is shown in FIG. 9, with the exception that here the diagonal incisions 8 alternate with diagonal incisions 10 which are straight in themselves and which, with the same length, are arranged at the same angle to the longitudinal axis of the strip 1, but extend opposite to the incisions 8. FIG. 8 shows a metal strip 1 in which U-shaped incisions 9 are placed in the center of the strip which consist of, in each case, two legs 9a, 9b extending in parallel to the longitudinal edges 1b, 1a and of a web 9c connecting these two legs. The web 9c extends perpendicularly with respect to the legs 9a, 9b. These types of incisions result in individual tabs 27 which, when the strip 1 is wound, can spread out of it and, as a result, on the one hand, are able to provide a good hold for the wound body, but, on the other hand, also offer the possibility that adjacent layers can expand against one another during thermal expansion.

FIG. 10 shows an embodiment in which a metal strip 1 is provided with curved incisions 11a, 11b which together, in the manner of a sinusoid, are placed in the central area of the strip 1 but, in each case, are separated from one another by uncut web portions 22.

Finally, FIG. 11 shows an embodiment similar to FIG. 4, with the exception that here the incisions 12, 12', which in this case extend at an angle ($\gamma$) to the longitudinal direction 26 of the strip 1 and have a mutual distance (d) with respect to one another, and do not change to the curved end portions 21, but extend only in a straight line.

FIG. 12 shows a cylinder body 24 produced by means of a metal strip 1 according to FIG. 11 by winding.

FIG. 13 shows this cylinder body 24 which, after being completed, is slid into a casing tube 23 and is firmly connected with it. The representation of the cross-section shows that, in each case, the ends of the incisions 12 which are open to the front faces, i.e., to the longitudinal edges 1a, 1b, form openings which are distributed relatively irregularly over the cross-section and which, in each case, offer space for the expansion of the supporting body when differences in temperature are to be expected between the metal tube 23 and the cylinder body 24.

The production of the metal strips 1, which are to be wound up or folded, is relatively simple. For the production of strips according to FIG. 3, additional cutting rollers 19' may be assigned to the winding device 20 which operate alternately with the pair of cutting rollers 19. One pair of cutting rollers may then make the incisions 2 over a certain portion of the length, after which the second pair of cutting rollers will make the incisions 2'. The construction of such pairs of cutting rollers is simple and known per se. It is also contemplated to produce the supporting body not only, as indicated here in FIG. 1, of one single corrugated strip, but, in each case, of a smooth and of a corrugated strip which, are wound on one another in a known manner. In this case, the strips would have to be supplied to the winding device 20 in different ways, if, for example, the smooth strip is provided with the incisions, but the corrugated strip remains without any incisions. It is also contemplated to incise both strips before the winding, in which case two pairs of cutting rollers would have to be assigned to the actual winding device for the two metal strips wound off respective coils. It should also be observed that it is very advantageous for the space (a or b, c or d) between the individual incisions, which start from the longitudinal edge of the strip, to correspond maximally to half the diameter of the cylinder body 24 times $\pi$. It was found that, in this case, a strength is obtained that is sufficient for the winding process, but that the desired expansion capability for the supporting body is achieved nevertheless.

Although the present invention has been described and illustrated in detail, it is to be clearly understood that the same is by way of illustration and example only, and is not to be taken by way of limitation. The spirit and scope of the present invention are to be limited only by the terms of the appended claims.

I claim:

1. A process for producing a supporting body for a catalytic reactor for purifying exhaust gas, particularly of internal-combustion engines in motor vehicles, comprising at least one of winding or folding at least one of corrugated or corrugated-and-smooth metal strips to form adjacent layers, fastening said layers in a casing tube, and providing slots extending transversely to the longitudinal direction of said strips, wherein the slots are first made in the form of incisions directly in the metal strips without removing material, and wherein the metal strips are only then subsequently wound up or folded to the final shape and are then slid into the casing tube, said slots allowing expansion of said layers.

2. A process according to claim 1, wherein at least one longitudinal edge of the metal strips is incised at points located behind one another.

3. A process according to claim 2, wherein the incisions are in each case made at the same distance from one another.

4. A process according to claim 2, wherein the incisions extend straight, in parallel to one another and at an acute angle to the longitudinal edge of the metal strip.

5. A process according to claim 4, wherein the incisions are disposed to be sloped against one another.

6. A process according to claim 5, wherein the incisions starting out from opposite longitudinal edges, are each offset at the same distance from one another to fill the gaps.

7. A process according to claim 6, wherein the incisions are in each case made at the same distance from one another.

8. A process according to claim 4, wherein the incisions are in each case made at the same distance from one another.

9. A process according to claim 2, wherein the incisions do not extend beyond the central area of the metal strips.

10. A process according to claim 9, wherein the incisions, at their closed end, each merge into a curve ending in the longitudinal direction of the strip.

11. A process according to claim 2, wherein the incisions extend beyond the center of the metal strip.

12. A process according to claim 1, wherein the metal strips are provided with the incisions in their center, spaced from longitudinal edges of the strips.

13. A process according to claim 12, wherein the incisions are straight incisions which extend diagonally with respect to the longitudinal axis of the strip.

14. A process according to claim 12, wherein U-shaped incisions with legs extending in parallel to the strip edges and a web arranged transversely between the legs.

15. A process according to claim 12, wherein the incisions are curved.

16. A process according to claim 15, wherein several curved incisions in the shape of a sinusoid are provided which are placed behind one another with an in-line arrangement of an uncut part.

17. A process according to claim 1, wherein both smooth and corrugated metal strips are wound or folded together to form the final shape of the supporting body.

18. A process according to claim 17, wherein the incisions are provided in the smooth metal strip.

19. A process according to claim 17, wherein the incisions are provided in the corrugated metal strip.

20. A process according to claim 17, wherein the incisions are provided in both the smooth and corrugated metal strips.

21. An arrangement for producing a supporting body for a catalytic reactor for purifying exhaust gas, particularly of internal-combustion engines in motor vehicles, in which at least one of corrugated or corrugated-and-smooth metal strips are at least one of wound or folded to form adjacent layers and are subsequently fastened in a casing tube, said strips being provided with slots extending transversely to their longitudinal direction, wherein the slots are first made in the form of incisions directly in the metal strips, and wherein the metal strips are only then subsequently wound up or folded to the final shape and are then slid into the casing tube, wherein the metal strip or strips are wound off a coil and are wound or folded to form the supporting body in a winding or folding device, and wherein a pair of cutting rollers is placed in front of the winding or folding device, the circumference of this pair of cutting rollers being provided with punching or cutting profiles which correspond to one another.

22. A process for producing a supporting body for a catalytic reactor for purifying exhaust gas, particularly of internal-combustion engines in motor vehicles, comprising at least one of winding or folding at least one of corrugated or corrugated-and-smooth metal strips to form adjacent layers, fastening said layers in a casing tube, and providing slots extending transversely to the longitudinal direction of said strips, wherein the slots are first made in the form of essentially closed incisions directly in the metal strips, and wherein the metal strips are only then subsequently wound up or folded to the final shape and are then slid into the casing tube, said slots allowing expansion of said layers.

* * * * *